(12) United States Patent
Namba et al.

(10) Patent No.: US 11,424,463 B2
(45) Date of Patent: Aug. 23, 2022

(54) FUEL CELL SYSTEM AND CONTROL METHOD THEREOF

(71) Applicant: TOYOTA JIDOSHA KABUSHIKI KAISHA, Toyota (JP)

(72) Inventors: Ryouichi Namba, Okazaki (JP); Masahiro Ito, Toyota (JP); Hiroyuki Tsunekawa, Seto (JP); Tomotaka Ishikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 17/166,021

(22) Filed: Feb. 3, 2021

(65) Prior Publication Data

US 2021/0257635 A1    Aug. 19, 2021

(30) Foreign Application Priority Data

Feb. 19, 2020   (JP) .............................. JP2020-026103

(51) Int. Cl.
| | |
|---|---|
| *H01M 8/04664* | (2016.01) |
| *H01M 8/04082* | (2016.01) |
| *H01M 8/04537* | (2016.01) |
| *H01M 8/04089* | (2016.01) |
| *H01M 8/04858* | (2016.01) |
| *H01M 8/04223* | (2016.01) |
| *H01M 8/04225* | (2016.01) |
| *H01M 8/04302* | (2016.01) |

(52) U.S. Cl.
CPC ... *H01M 8/04679* (2013.01); *H01M 8/04089* (2013.01); *H01M 8/0491* (2013.01); *H01M 8/0494* (2013.01); *H01M 8/04201* (2013.01); *H01M 8/04225* (2016.02); *H01M 8/04253* (2013.01); *H01M 8/04268* (2013.01); *H01M 8/04302* (2016.02); *H01M 8/04559* (2013.01); *H01M 2250/20* (2013.01)

(58) Field of Classification Search
None
See application file for complete search history.

(56) References Cited

FOREIGN PATENT DOCUMENTS

JP    2010061960 A    3/2010

*Primary Examiner* — Haroon S. Sheikh
(74) *Attorney, Agent, or Firm* — Dickinson Wright, PLLC (57) ABSTRACT

A fuel cell system includes a fuel cell stack, an oxidizing gas supply system, a fuel gas supply system, a current control circuit configured to control an output current of the fuel cell stack, a control unit configured to control power generation of the fuel cell stack, and the output current of the current control circuit, the control unit controlling the current control circuit to adjust the output current thereby adjusting a heating value of the fuel cell stack; and a monitoring unit configured to monitor abnormal fuel gas generation, the abnormal fuel gas generation corresponding to a state where the fuel gas in excess of a predetermined allowable amount exists in the cathode. When the monitoring unit detects the abnormal fuel gas generation during execution of a warm-up operation to allow the fuel cell stack to generate heat with a predetermined target heating value, the control unit reduces the output current by reducing the target heating value.

6 Claims, 10 Drawing Sheets

FUEL CELL SYSTEM AND CONTROL METHOD THEREOF

CROSS REFERENCE TO RELATED APPLICATIONS

The present application claims priority based on Japanese Patent Application No. 2020-26103 filed on Feb. 19, 2020, and the entire disclosed contents are incorporated in the present application by reference.

BACKGROUND

Field

The present disclosure relates to a fuel cell system and a control method thereof.

Related Art

Some fuel cell systems execute warm-up operations for quickly raising the temperatures of fuel cell stacks when starting the fuel cell stacks in low temperature environments, such as below freezing point. Such warm-up operations allow for the suppression of failure due to frozen moisture in the fuel cell stack or in the reaction gas flow path. As disclosed in, for example, Japanese Unexamined Patent Application Publication No. 2010-61960, the warm-up operation, in some cases, may reduce the supply amount of oxidizing gas and degrade the efficiency in power generation of the fuel cell stack, thereby increasing the heating value of the fuel cell stack.

In warm-up operations in which the supply amount of the oxidizing gas is restricted in relation to a cathode as described above, the oxidizing gas supplied to the cathode is likely to be insufficient. Thus, fuel gas is generated in the cathode, and the fuel gas concentration in the exhaust gas is likely to increase. In cases where hydrogen is used as fuel gas, the fuel gas generated in the cathode is also referred to as "pumping hydrogen". In Patent Document 1 described above, in cases where it is detected that the pumping hydrogen has been abnormally generated during the execution of the warm-up operation, the amount of oxidizing gas supplied to the fuel cell stack is increased, thereby eliminating the shortage of oxidizing gas in the cathode, and suppressing elevation of the hydrogen concentration in the exhaust gas.

However, in cases where the amount of oxidizing gas supplied during the warm-up operation is increased in this manner, even if elevation of the fuel gas concentration in the exhaust gas is able to be suppressed, the temperature increase rate thereof may be reduced due to the higher efficiency in power generation of the fuel cell stack, with the result that the warm-up operation may be prolonged. In cases where the supply amount of the oxidizing gas fluctuates greatly during the warm-up operation, the power generation of the fuel cell stack may become unstable, and power generation control of the fuel cell system may be difficult to execute. As described above, there is room for improvement regarding solutions for times when fuel gas is abnormally generated in the cathode during warm-up operations. It is noted that the fuel gas may be abnormally generated in the cathode not only during warm-up operations in which the supply to the cathode of the oxidizing gas is restricted, but also during other methods of warm-up operation; for example, in cases where supply of the oxidizing gas to the cathode stagnates due to frozen moisture in the oxidizing gas flow path.

SUMMARY

The present disclosure in one aspect provides a fuel cell system. The fuel cell system includes a fuel cell stack comprising an anode and a cathode; an oxidizing gas supply system configured to supply oxidizing gas to the cathode; a fuel gas supply system configured to supply fuel gas to the anode; a current control circuit configured to control an output current of the fuel cell stack; a control unit configured to control power generation of the fuel cell stack, and the output current of the current control circuit, the control unit controlling the current control circuit to adjust the output current thereby adjusting a heating value of the fuel cell stack; and a monitoring unit configured to monitor abnormal fuel gas generation, the abnormal fuel gas generation corresponding to a state where the fuel gas in excess of a predetermined allowable amount exists in the cathode. When the monitoring unit detects the abnormal fuel gas generation during execution of a warm-up operation to allow the fuel cell stack to generate heat with a predetermined target heating value, the control unit reduces the output current by reducing the target heating value.

According to the fuel cell system in the present aspect, when abnormal fuel gas generation is detected in the cathode during the execution of the warm-up operation, the target heating value is reduced, and thereby the current of the fuel cell stack is reduced. This suppresses ion conduction of the fuel gas to the cathode, enabling the reduction of the fuel gas present in the cathode. Therefore, due to the fuel gas present in the cathode, the power generation amount of the fuel cell stack is reduced, and thus the actual heating value of the fuel cell stack is prevented from being significantly reduced to a value lower than the target heating value, and the fuel cell system is capable of suppressing the reduction of the temperature increase rate of the fuel cell stack during warm-up operations.

DETAILED DESCRIPTION

1. Embodiments

Figure 1:
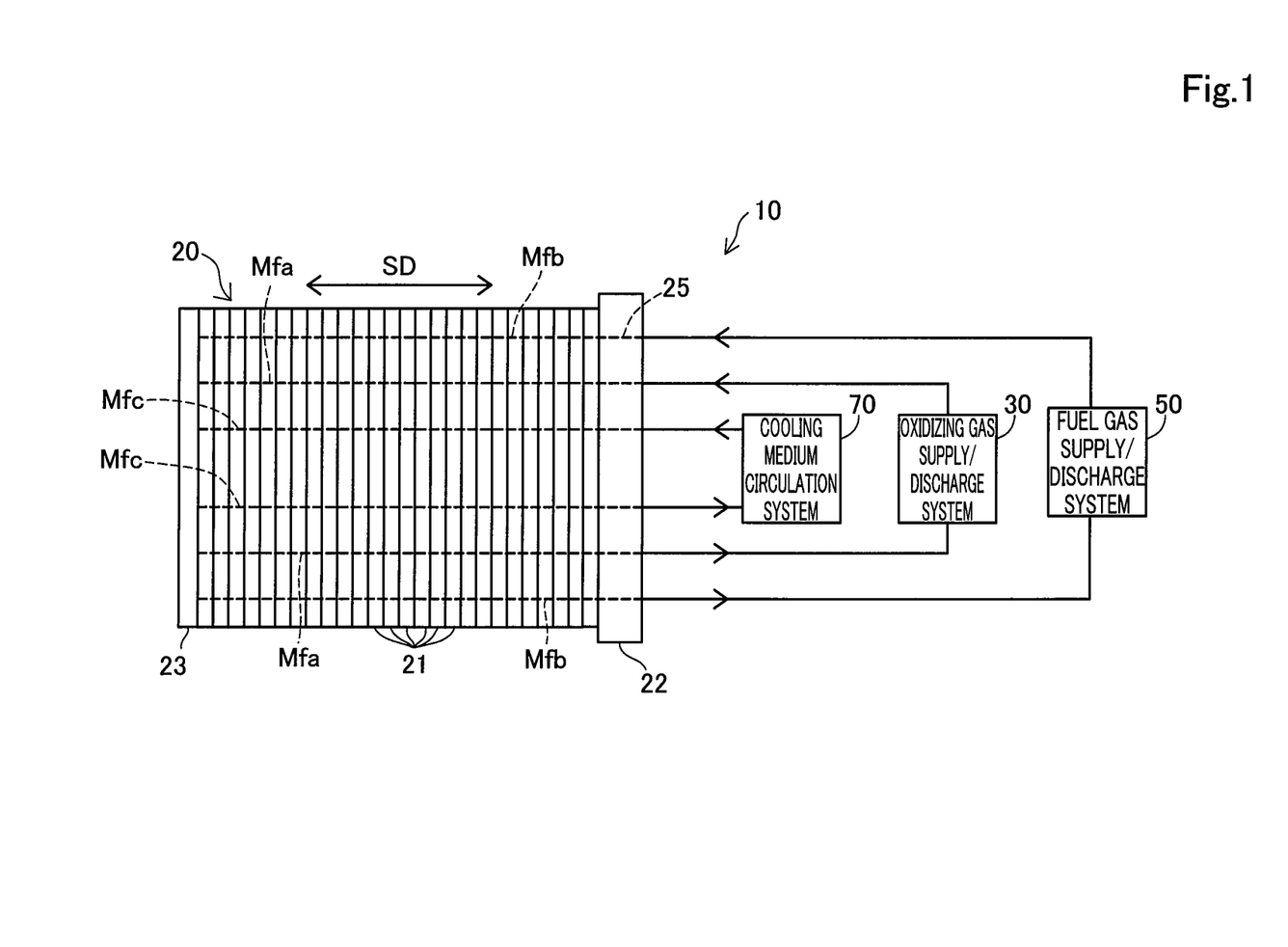
FIG. 1 shows a schematic diagram representing a configuration of a fuel cell system.

FIG. 1 shows a schematic diagram representing the configuration of a fuel cell system 10 in the present embodiment. The fuel cell system 10 is mounted on, for example, a fuel cell vehicle, and outputs the power required by a load (to be described later) and the power required for feeding power to the outside. The fuel cell system 10 includes a fuel cell stack 20, an oxidizing gas supply/discharge system 30, a fuel gas supply/discharge system 50, and a cooling medium circulation system 70.

The fuel cell stack 20 includes a plurality of fuel cells 21 and a pair of end terminals 22, 23. The plurality of fuel cells 21 respectively having plate-like shapes are stacked in a stacking direction SD corresponding to the thickness direction thereof. Even as single units, the fuel cells 21 serve as power generation elements capable of generating power. The fuel cell 21 is supplied with oxidizing gas and fuel gas as reaction gas, and generates power by electrochemical reaction thereof. In the present embodiment, the fuel cell 21 is configured as a solid polymer type fuel cell. In the present embodiment, oxygen contained in the air serves as oxidizing gas, and hydrogen serves as fuel gas.

The fuel cell 21 includes a membrane electrode assembly, which has an electrolyte membrane configured with ion conductive polymer resin film and has an anode and a cathode corresponding to electrodes carrying catalysts on the surfaces of the electrolyte membrane. The fuel cell 21 further includes two separators holding the membrane electrode assembly therebetween. Neither the membrane electrode assembly nor the separators is shown in FIG. 1. Each of the fuel cells 21 has, on its outer peripheral end, openings (not shown) forming manifolds Mfa, Mfb for circulating reaction gas and the reaction off-gas after passing through a power generation part of the membrane electrode assembly. The manifolds Mfa, Mfb are branched and connected to the power generation part of the membrane electrode assembly. The manifold Mfa is connected to the cathode, and the manifold Mfb is connected to the anode. Each of the fuel cells 21 has, on its outer peripheral end, an opening (not shown) forming a manifold Mfc for circulating a cooling medium. The manifold Mfc is connected to a cooling medium flow path formed between adjacent separators.

The end terminals 22, 23 in pair are disposed at both ends in the stacking direction SD of the plurality of fuel cells 21. Specifically, the first end terminal 22 is disposed at one end of the fuel cell stack 20, and the second end terminal 23 is disposed at the other end of the fuel cell stack 20, opposite to the one end. The first end terminal 22 has openings 25 corresponding to the through holes forming the manifolds Mfa, Mfb, Mfc. On the other hand, the second end terminal 23 has none of the openings 25 corresponding to the through holes forming the manifold Mfa, Mfb, Mfc. Thus, the fuel gas, the oxidizing gas and the cooling medium are supplied to and discharged from only one side in the stacking direction SD of the fuel cell stack 20.

The oxidizing gas supply/discharge system 30 has an oxidizing gas supply function, an oxidizing gas discharge function, and an oxidizing gas bypass function. The oxidizing gas supply function is executed to supply the oxidizing gas to the cathode of the fuel cell 21. The oxidizing gas discharge function is executed to discharge, to the outside, the exhaust gas (also referred to as "oxidizing off-gas") containing the oxidizing gas and the inert gas discharged from the cathode of the fuel cell 21. The oxidizing gas bypass function is executed to discharge the supplied oxidizing gas to the outside without going through the fuel cell 21.

The fuel gas supply/discharge system 50 has a fuel gas supply function, a fuel gas discharge function, and a fuel gas circulation function. The fuel gas supply function is executed to supply fuel gas to the anode of the fuel cell 21. The fuel gas discharge function is executed to discharge, to the outside, the exhaust gas (also referred to as "fuel off-gas") containing the fuel gas and the inert gas discharged from the anode of the fuel cell 21. The fuel gas circulation function is executed to circulate the fuel gas in the fuel cell system 10.

The cooling medium circulation system 70 has a function of adjusting the temperature of the fuel cell stack 20 by circulating the cooling medium in the fuel cell stack 20. Examples of the cooling medium include antifreezes such as ethylene glycol and liquids such as water.

Figure 2:
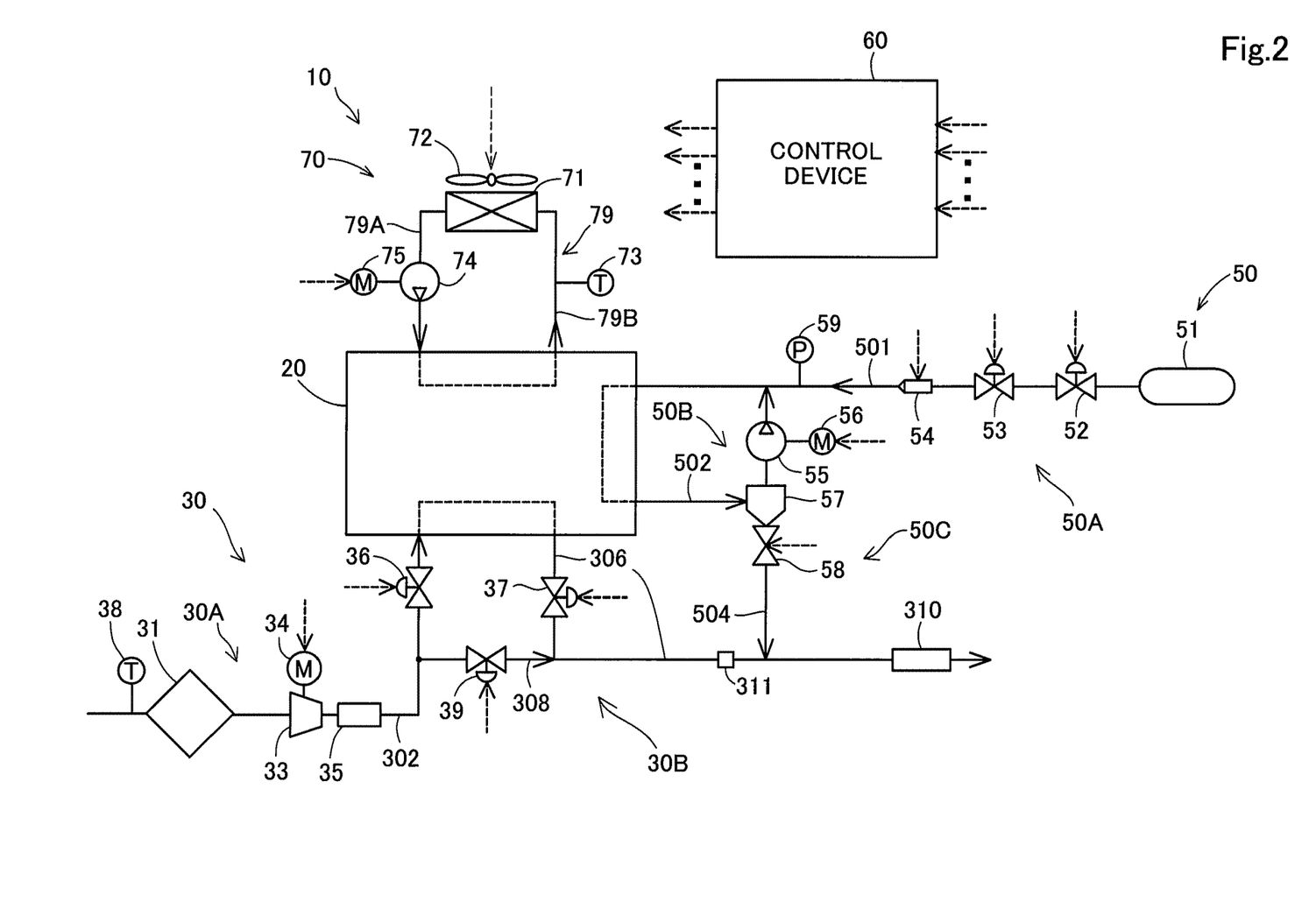
FIG. 2 shows a schematic diagram representing a more detailed configuration of the fuel cell system.

FIG. 2 shows a schematic diagram representing the detailed configuration of the fuel cell system 10. The fuel cell system 10 has not only the above-described components including the fuel cell stack 20, the oxidizing gas supply/discharge system 30, the fuel gas supply/discharge system 50 and the cooling medium circulation system 70, but also a control device 60. The control device 60 controls the operation of the fuel cell system 10. The control device 60 will be detailed later.

The oxidizing gas supply/discharge system 30 includes an oxidizing gas supply system 30A and an oxidizing gas discharge system 30B. The oxidizing gas supply system 30A supplies air containing the oxidizing gas to the cathode of the fuel cell stack 20. The oxidizing gas supply system 30A includes an oxidizing gas supply path 302, an outside air temperature sensor 38, an air cleaner 31, a compressor 33, a motor 34, an intercooler 35 and an inlet valve 36.

The oxidizing gas supply path 302, which is disposed on the upstream side of the fuel cell stack 20, is a pipe which connects the outside and the cathode of the fuel cell stack 20. The outside air temperature sensor 38 measures the temperature of the air taken into the air cleaner 31 as the outside air temperature. The measurement result of the outside air temperature sensor 38 is transmitted to the control device 60. The air cleaner 31, which is disposed further toward the upstream side than the compressor 33 on the oxidizing gas supply path 302, removes foreign substances from the air to be supplied to the fuel cell stack 20. The compressor 33, which is disposed further toward the oxidizing gas supply path 302 on the upstream side than the fuel cell stack 20, sends compressed air toward the cathode upon the instruction given by the control device 60. The compressor 33 is driven by the motor 34 which operates upon the instruction given by the control device 60. The intercooler 35 is disposed on the downstream side of the compressor 33 on the oxidizing gas supply path 302. The intercooler 35 cools the air heated by being compressed by the compressor 33. The inlet valve 36 controls the pressure of the air on the cathode inlet side of the fuel cell stack 20. The inlet valve 36 is configured with a solenoid valve or a motor operated valve which is controlled in its opening by the control device 60. The inlet valve 36 may be configured with an opening/closing valve which mechanically opens when the air compressed at a predetermined level flows in.

The oxidizing gas discharge system 30B discharges the oxidizing off-gas which has circulated through the cathode to the outside. The oxidizing gas discharge system 30B has an oxidizing gas discharge path 306 and a bypass path 308. The oxidizing gas discharge path 306 is a pipe for discharging to the outside the oxidizing off-gas and moisture discharged from the cathode of the fuel cell stack 20, and the air which has circulated through the bypass path 308. In the present embodiment, as will be described later, the oxidizing gas discharge path 306 further allows to discharge the fuel off-gas and wastewater discharged from a gas/water discharge path 504, to the outside. A muffler 310 is disposed on the downstream end side of the oxidizing gas discharge path 306. An outlet valve 37 is disposed on the oxidizing gas discharge path 306. The outlet valve 37 is disposed further toward the upstream side than the point where the bypass path 308 is connected on the oxidizing gas discharge path 306. The outlet valve 37 is configured with a solenoid valve or a motor operated valve. The control device 60 regulates the aperture of the outlet valve 37, thereby regulating the back pressure of the cathode side flow path of the fuel cell stack 20.

The bypass path 308 is a pipe connecting the oxidizing gas supply path 302 and the oxidizing gas discharge path 306 without going through the fuel cell stack 20. A bypass valve 39 is disposed on the bypass path 308. The bypass valve 39 is configured with a solenoid valve or a motor operated valve. The control device 60 regulates the aperture of the bypass valve 39, thereby regulating the flow rate of the air circulating through the bypass path 308.

In the present embodiment, a fuel gas sensor 311 is disposed further toward the upstream side than the merging point of the oxidizing gas discharge path 306 with the gas/water discharge path 504. The fuel gas sensor 311 detects fuel gas concentration in the exhaust gas flowing through the oxidizing gas discharge path 306, and transmits the detected result to the control device 60. In the present embodiment, the fuel gas sensor 311 is configured with a hydrogen concentration sensor. As will be described later, the fuel gas sensor 311 is used to detect the abnormal generation of fuel gas in the cathode.

The fuel gas supply/discharge system 50 includes a fuel gas supply system 50A, a fuel gas circulation system 50B and a fuel gas discharge system 50C.

The fuel gas supply system 50A supplies the fuel gas to the anode of the fuel cell stack 20. The fuel gas supply system 50A includes a fuel gas supply path 501, a fuel gas tank 51, an opening/closing valve 52, a regulator 53, an injector 54 and a pressure sensor 59. The fuel gas supply path 501 is a pipe which is connected to the fuel gas tank 51 and the fuel cell stack 20 so as to allow the fuel gas to flow from the fuel gas tank 51 towards the fuel cell stack 20. The fuel gas tank 51 stores, for example, high-pressure hydrogen gas. The opening/closing valve 52 is disposed in front of the fuel gas tank 51 on the fuel gas supply path 501. The opening/closing valve 52 in an open state allows the fuel gas in the fuel gas tank 51 to flow to a downstream side. The regulator 53 is disposed on the downstream side of the opening/closing valve 52 on the fuel gas supply path 501. The control device 60 controls the regulator 53 to regulate the pressure of the fuel gas on the upstream side of the injector 54. The injector 54 is disposed on the downstream side of the regulator 53 on the fuel gas supply path 501. The injector 54 is disposed further toward the upstream side than the merging point of the fuel gas circulation path 502 on the fuel gas supply path 501 (to be described later). The injector 54 is an opening/closing valve which is electromagnetically driven at the driving cycle or the opening time set by the control device 60. The control device 60 controls the injector 54 to regulate the fuel gas supply amount to be supplied to the fuel cell stack 20. The pressure sensor 59 measures the internal pressure on the downstream side of the injector 54 on the fuel gas supply path 501, that is, the supply pressure of the fuel gas. The measurement result is transmitted to the control device 60.

The fuel gas circulation system 50B circulates the fuel off-gas discharged from the fuel cell stack 20 to the fuel gas supply path 501. The fuel gas circulation system 50B has a fuel gas circulation path 502, a gas/liquid separator 57, a circulation pump 55 and a motor 56. The fuel gas circulation path 502 is a pipe which is connected to the fuel cell stack 20 and the fuel gas supply path 501 so as to allow the fuel off-gas to flow toward the fuel gas supply path 501. The gas/liquid separator 57, which is disposed on the fuel gas circulation path 502, separates the liquid component containing water vapor from the fuel off-gas, and stores it in a liquid state. The circulation pump 55 is disposed on the downstream side of the gas/liquid separator 57 on the fuel gas circulation path 502. The circulation pump 55 circulates the fuel off-gas in the fuel gas circulation path 502 toward the fuel gas supply path 501 by driving the motor 56.

The fuel gas discharge system 50C discharges the fuel off-gas and the liquid water generated by the power generation of the fuel cell stack 20 to the outside of the fuel gas supply/discharge system 50. The fuel gas discharge system 50C has the gas/water discharge path 504 and a gas/water discharge valve 58. The gas/water discharge path 504 is a pipe which is connected to the outlet of the gas/liquid separator 57 configured to discharge liquid water, and the oxidizing gas discharge path 306. In the present embodiment, the gas/water discharge path 504 discharges the fuel off-gas and the exhaust water to the atmosphere through the oxidizing gas discharge path 306. The gas/water discharge valve 58 is disposed on the gas/water discharge path 504, so as to open and close the gas/water discharge path 504. The gas/water discharge valve 58 is, for example, a diaphragm valve. The control device 60 gives an instruction to open the valve to the gas/water discharge valve 58 at a predetermined timing at the time of power generation by the fuel cell system 10.

The cooling medium circulation system 70 includes a cooling medium circulation path 79, a cooling medium circulation pump 74, a motor 75, a radiator 71, a radiator fan 72 and a stack temperature sensor 73.

The cooling medium circulation path 79 has a cooling medium supply path 79A and a cooling medium discharge path 79B. The cooling medium supply path 79A is a pipe for supplying the cooling medium to the fuel cell stack 20. The cooling medium discharge path 79B is a pipe for discharging the cooling medium from the fuel cell stack 20. The cooling medium circulation pump 74 sends the cooling medium flowing through the cooling medium supply path 79A to the fuel cell stack 20 by driving the motor 75. The radiator 71 releases heat by use of the wind sent by the radiator fan 72 to cool the cooling medium circulating inside. The stack temperature sensor 73 measures the temperature of the cooling medium in the cooling medium discharge path 79B. The measurement result of the temperature of the cooling medium is transmitted to the control device 60. The control device 60 detects the temperature measured by the stack temperature sensor 73 as the temperature of the fuel cell stack 20 and uses it in controlling the fuel cell system 10.

Figure 3:
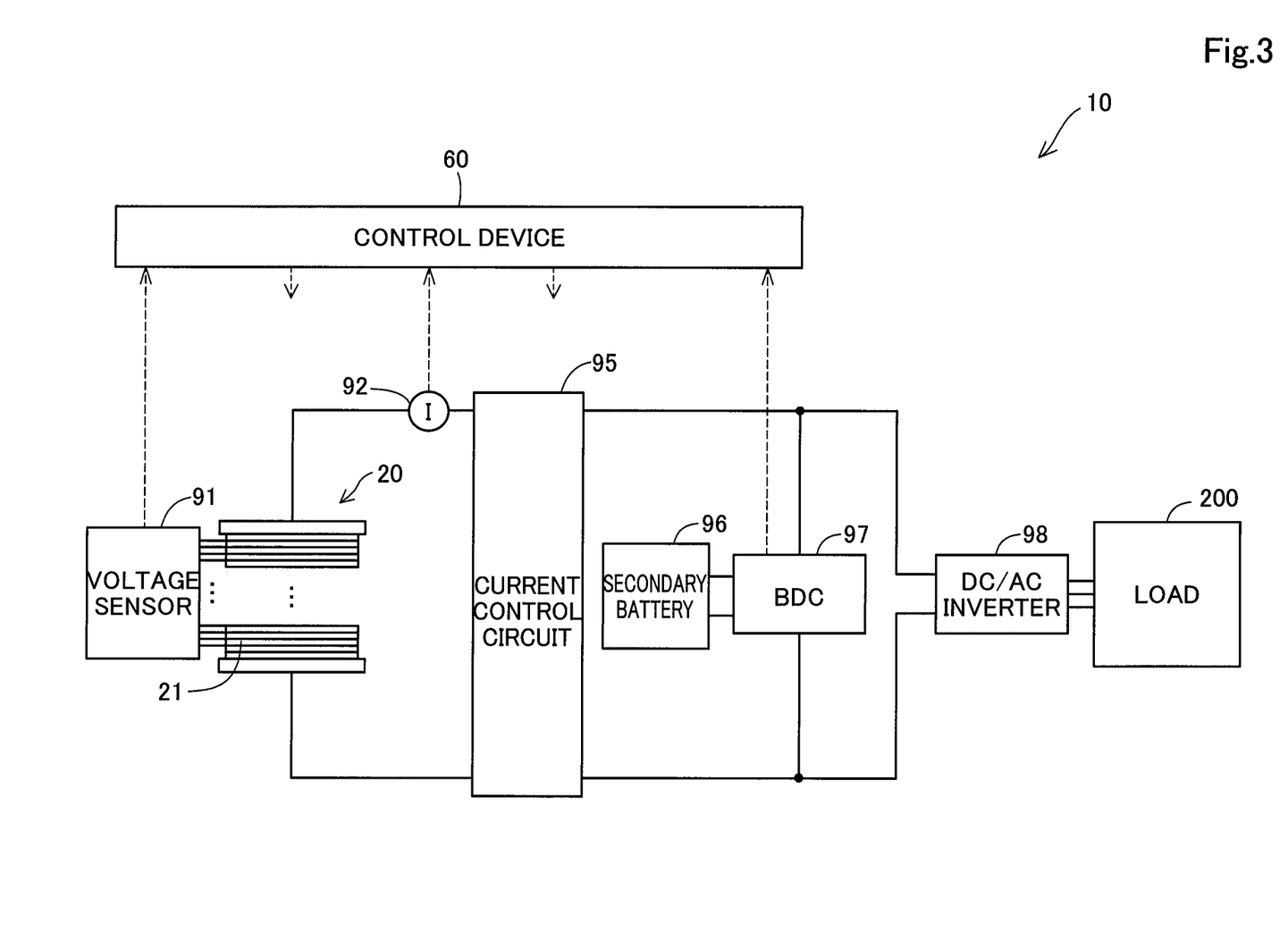
FIG. 3 shows a schematic diagram representing an electrical configuration of the fuel cell system.

FIG. 3 shows a conceptual diagram representing the electrical configuration of the fuel cell system 10. The fuel cell system 10 includes a current control circuit 95, a DC/AC inverter 98, a voltage sensor 91 and a current sensor 92.

The voltage sensor 91 is used to measure the voltage of the fuel cell stack 20. The voltage sensor 91 is connected to the fuel cells 21 of the fuel cell stack 20 respectively, so as to measure the voltage of all of the fuel cells 21 respectively. The voltage sensor 91 transmits the measurement results to the control device 60. All of the measured voltages of the fuel cells 21 measured by the voltage sensor 91 are added up to measure the total voltage of the fuel cell stack 20. It is noted that the fuel cell system 10 may have, instead of the voltage sensor 91, a voltage sensor configured to measure the voltage of both ends of the fuel cell stack 20. In this case, the measured voltage of both of the ends corresponds to the total voltage of the fuel cell stack 20. The current sensor 92 measures the current value output by the fuel cell stack 20, and transmits the measurement result to the control device 60.

The current control circuit 95 is configured with, for example, a DC/DC converter. The current control circuit 95 controls the current output by the fuel cell stack 20 on the basis of the current command value transmitted from the control device 60. The current command value represents the target value of the current output by the fuel cell stack 20, and is set by the control device 60.

The DC/AC inverter 98 is connected to the fuel cell stack 20 and a load 200. Examples of the load 200 include a driving motor corresponding to a driving power source, and other auxiliary machines and electrical components in the fuel cell vehicle. The DC/AC inverter 98 converts the DC power output by the fuel cell stack 20 to AC power, and supplies the AC power to the load 200. In cases where regenerative power is generated in the driving motor included in the load 200, the DC/AC inverter 98 converts the regenerative power to DC power. The regenerative power converted to DC power by the DC/AC inverter 98 is stored in a secondary battery 96 via a BDC 97.

The fuel cell system 10 further includes the secondary battery 96 and the BDC 97. The secondary battery 96 functions as a power source for the fuel cell system 10, as well as the fuel cell stack 20. The secondary battery 96 is charged with the power generated by the fuel cell stack 20 and the regenerative power described above. It is noted that the secondary battery 96, which is configured with a lithium ion battery in the present embodiment, has temperature characteristics wherein the allowable range for charging/discharging amounts becomes significantly narrower below freezing point. The temperature characteristics of the secondary battery 96 will be described later.

The BDC 97, which is configured with a DC/DC converter, controls the charging and discharging of the secondary battery 96 upon the instruction given by the control device 60. The BDC 97 measures the SOC (state of charge: residual capacity) of the secondary battery 96, and transmits the measurement result to the control device 60.

Figure 4:
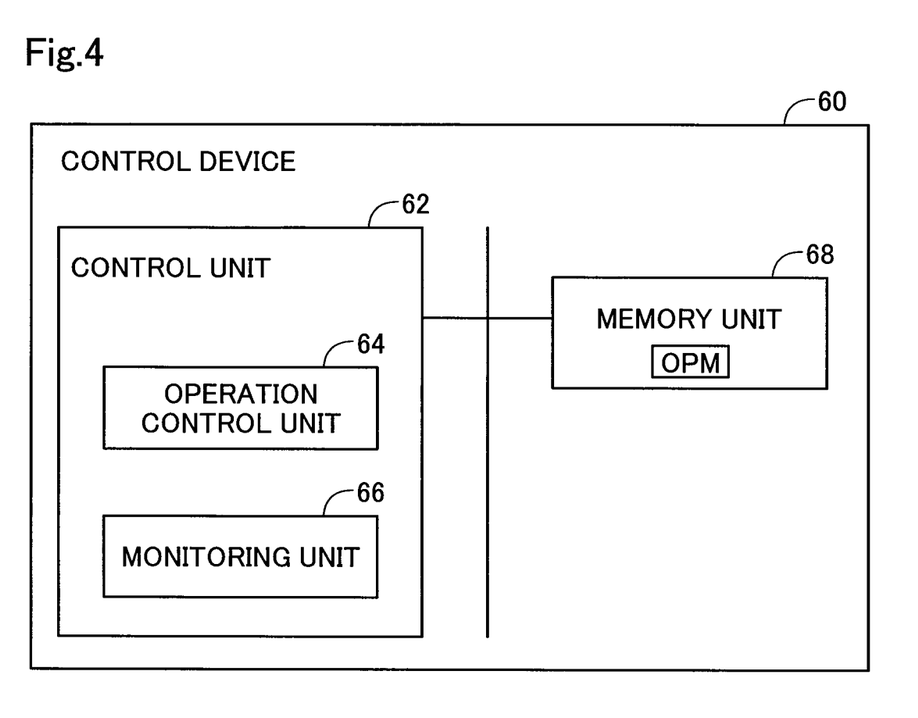
FIG. 4 shows a schematic block diagram representing an inside of a control device.

FIG. 4 shows a block diagram representing the inside of the control device 60. The control device 60, which is also called an ECU, includes a control unit 62 and a memory unit 68 configured with an external memory device such as a ROM or a hard disk. The control unit 62 includes at least one processor and a main memory, and exhibits various types of functions for controlling the power generation of the fuel cell stack 20 when the processor executes the program or the instruction read from the memory unit 68 to the main memory. It is noted that at least some of the functions of the control unit 62 may be configured with a hardware circuit.

The memory unit 68 stores various types of programs to be executed by the control unit 62, parameters for use in controlling the fuel cell system 10, and various types of maps including an operating point map OPM to be described later, in a non-volatile manner. "Non-volatile manner" means that the memory device retains information without it disappearing even after power to the memory device has been turned off. The control unit 62 functions as an operation control unit 64 and a monitoring unit 66 by executing various types of programs stored in the memory unit 68. The operation control unit 64 controls the operation of the fuel cell system 10. The operation control unit 64, executes a normal operation wherein it makes the fuel cell stack 20 generate power upon an output request from the load 200 to the fuel cell system 10.

The operation control unit 64 executes a warm-up operation for quickly raising the temperature of the fuel cell stack 20. The warm-up operation is executed in cases where predetermined warm-up conditions are satisfied in the start processing (to be described later) executed by the operation control unit 64 in starting the fuel cell system 10. In the present embodiment, the warm-up conditions are satisfied when the measurement value measured by the outside air temperature sensor 38 is equal to or lower than a predetermined temperature. In another embodiment, the warm-up conditions may be satisfied, for example, when the fuel cell system 10 is left in a stopped state in winter for a predetermined time or longer. In the warm-up operation, unlike in the normal operation, the operation control unit 64 sets a target heating value for the fuel cell stack 20, and controls the fuel cell stack 20 so that it generates power at the target heating value, regardless of the output request from the load 200.

In the warm-up operation of the present embodiment, the operation control unit 64 controls the oxidizing gas supply/discharge system 30 and the fuel gas supply/discharge system 50, so that the stoichiometric ratio of the oxidizing gas to be supplied to the fuel cell stack 20 becomes smaller than the stoichiometric ratio in the normal operation. "Stoichiometric ratio of the oxidizing gas" means the ratio of the amount of the oxidizing gas to be actually supplied relative to the amount of the oxidizing gas theoretically required to generate the necessary power. The present control increases concentration overvoltage in the cathode and lowers the efficiency in power generation of the fuel cell stack 20, thereby increasing the heating value of the fuel cell stack 20 to more than in the normal operation, and increasing the temperature increase rate of the fuel cell stack 20. The stoichiometric ratio of the oxidizing gas in the warm-up operation may be set to, for example, approx. 1.0. In the warm-up operation of the present embodiment, the operation control unit 64 maintains predetermined supply amounts of oxidizing gas and fuel gas to the fuel cell stack 20.

In the present embodiment, the operation control unit 64 executes control so that the fuel cell stack 20 generates a predetermined constant power while the warm-up operation is executed. The constant power is desirably set to a value equal to or higher than the power which is expected to be consumed by the load 200 during the warm-up operation. The constant power may be, for example, approx. 5 to 15 kW.

The monitoring unit 66 monitors abnormal generation of the fuel gas in the cathode of the fuel cell stack 20. The following description is about abnormal generation of the fuel gas in the cathode. In the fuel cell stack 20, when the fuel gas ionized in the anode moves to the cathode via the electrolyte membrane and is recombined with an electron, fuel gas is generated in the cathode. Such generation of fuel gas in the cathode is likely to occur when the amount of the oxidizing gas supplied to the cathode is insufficient. In cases where the fuel gas is hydrogen, the fuel gas generated in the cathode is also called "pumping hydrogen". The "fuel gas generated in the cathode" in the following description may be replaced with "pumping hydrogen". The monitoring unit 66 detects the generation of the fuel gas in excess of an allowable amount in the cathode as the abnormal generation of fuel gas in the cathode.

In the present embodiment, the monitoring unit 66 detects the abnormal generation of the fuel gas in the cathode when the fuel gas concentration in the exhaust gas measured by the fuel gas sensor 311 exceeds a predetermined allowable amount. In another embodiment, the monitoring unit 66 may detect abnormal generation of the fuel gas in the cathode by a method other than the monitoring of the fuel gas concentration in the exhaust gas. In an example, the monitoring unit 66 may detect the abnormal generation of the fuel gas in the cathode on the basis of the variation in the voltage of the fuel cell stack 20 which is considered to result from the abnormal generation of the fuel gas in the cathode.

In cases where the monitoring unit 66 detects the abnormal generation of fuel gas in the cathode during the execution of the warm-up operation, the operation control unit 64 executes processing for reducing the target heating value of the fuel cell stack 20. This will be described later in detail.

Figure 5:
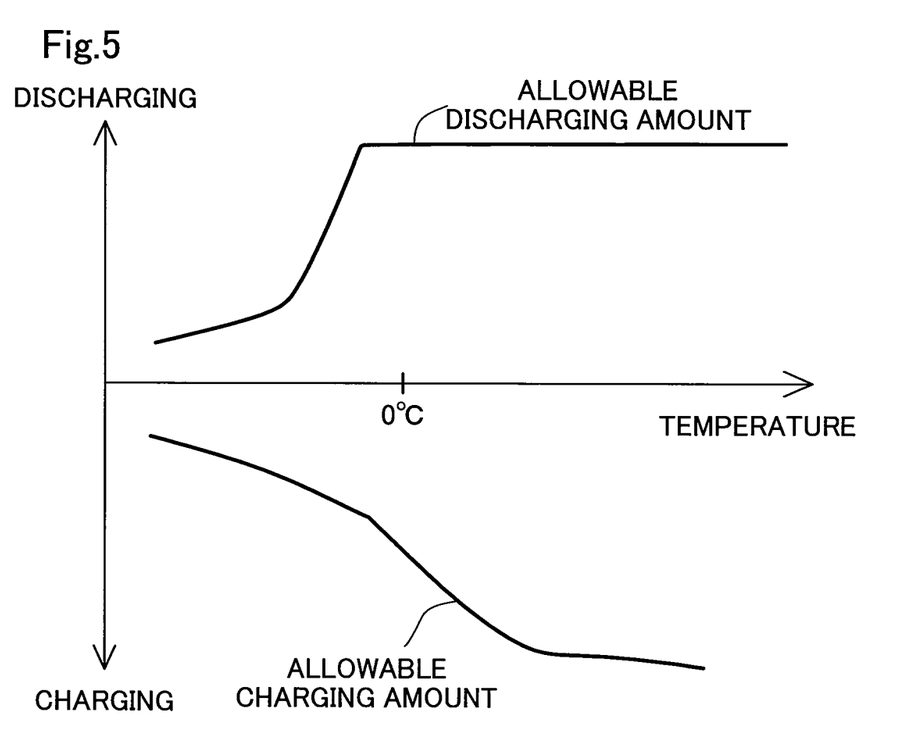
FIG. 5 shows an explanatory graph representing temperature characteristics of a secondary battery.

FIG. 5 shows a graph representing the temperature characteristics of the secondary battery 96. When below freezing point, especially when at −20° C. (20 degrees Celsius) or lower, the power output range of a secondary battery such as a lithium ion battery that can be rapidly charged or discharged decreases. Therefore, in cases where the power generated by the fuel cell stack 20 exceeds or falls short of required power below freezing point, it may be difficult for the secondary battery 96 to store the excess power output or to discharge the shortage. In the present embodiment, during the warm-up operation, the power generated by the fuel cell stack 20 is controlled to be kept at the above-described constant level, so that the charging/discharging amounts of the secondary battery 96 fall within a predetermined range. This suppresses the variation of the power of the fuel cell stack 20 during the execution of the warm-up operation, and thus suppresses load application to the secondary battery 96 having a narrow allowable range of charging/discharging amounts due to a low temperature. As a result, deterioration in the secondary battery 96 is suppressed, for example, with elution of lithium from the secondary battery 96 due to an excessive load.

Figure 6:
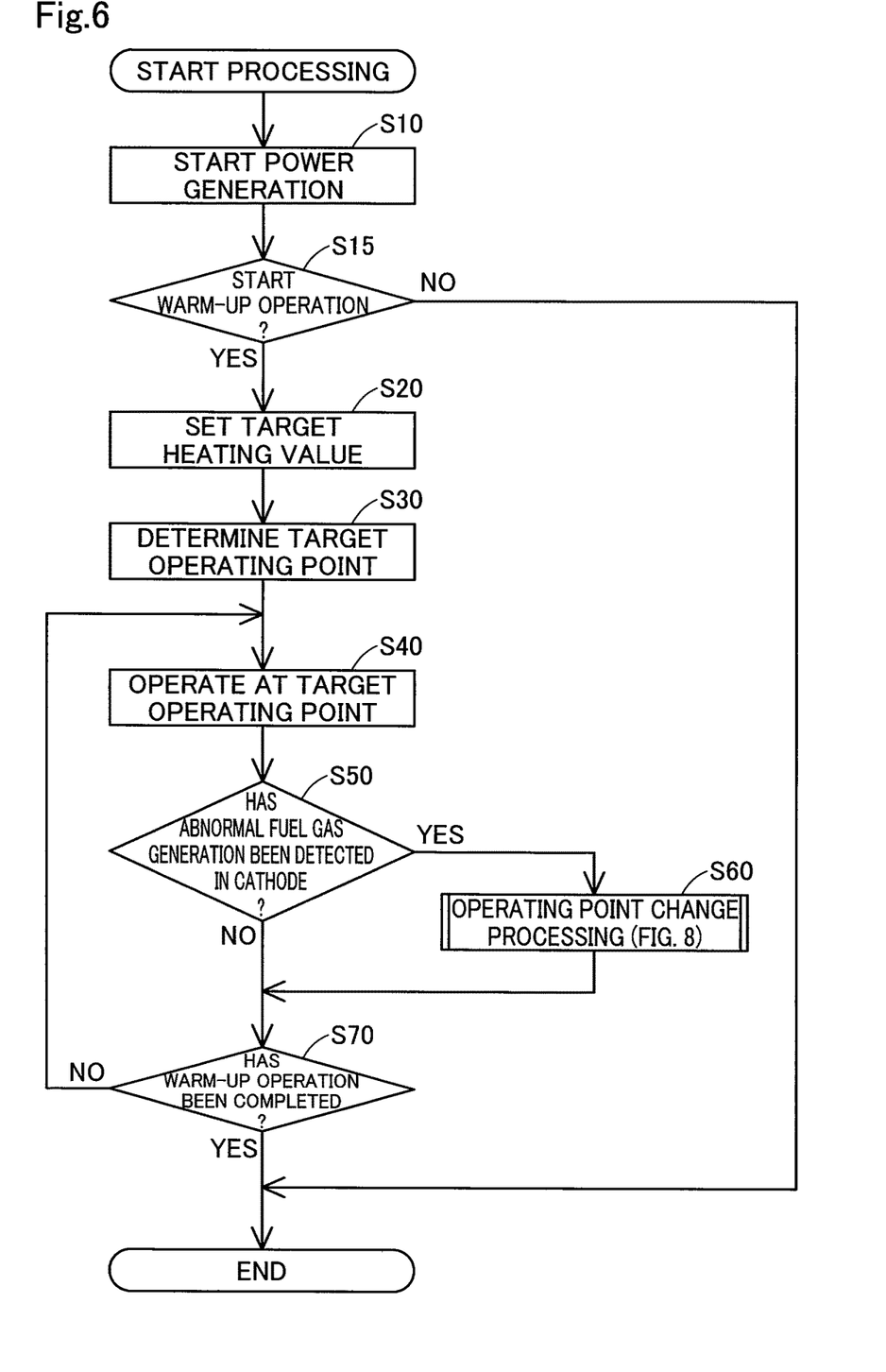
FIG. 6 shows an explanatory diagram representing a flowchart showing start processing in the fuel cell system.

FIG. 6 shows an explanatory diagram representing a flowchart showing the start processing to be executed by the operation control unit 64 of the control unit 62. The start processing is executed by the operation control unit 64 when the fuel cell vehicle is started and the instruction to start operation of the fuel cell system 10 is given. In step S10, the operation control unit 64 makes the fuel cell stack 20 start power generation. Specifically, the operation control unit 64 makes the oxidizing gas supply/discharge system 30 start to supply air containing oxidizing gas to the cathode of the fuel cell stack 20, and further makes the fuel gas supply/discharge system 50 start to supply fuel gas to the anode of the fuel cell stack 20.

In step S15, the operation control unit 64 determines whether or not the warm-up conditions corresponding to the start conditions of the warm-up operation are satisfied. As described above, in the present embodiment, in cases where the measurement value measured by the outside air temperature sensor 38 is equal to or lower than a predetermined temperature, the operation control unit 64 determines that the warm-up conditions have been satisfied. In the present embodiment, the threshold temperature in the warm-up conditions is the freezing point. The threshold temperature of the warm-up conditions may be a temperature lower than the freezing point, or may be a temperature higher than, but in the vicinity of, the freezing point. In cases where the warm-up conditions are not satisfied, the operation control unit 64 finishes the start processing without executing the warm-up operation, and starts the normal operation. In cases where the warm-up conditions are satisfied, the operation control unit 64 starts the warm-up operation described below, which includes the steps from step S20 to step S70.

In step S20, the operation control unit 64 sets the target heating value which is the target value of the heating value of the fuel cell stack 20 in the warm-up operation. The lower the current outside air temperature or the temperature of the fuel cell stack 20, the higher the target heating value set by the operation control unit. The operation control unit 64 may set the target heating value on the basis of the map which is prepared in advance and stored in the memory unit 68.

In step S30, the operation control unit 64 determines the target operating point so that the fuel cell stack 20 is made to generate heat at the target heating value. The target operating point herein means the target power generation state of the fuel cell stack 20, which is determined depending on the combination of a target current value and a target voltage value of the fuel cell stack 20. The operation control unit 64 obtains a target operating point TP relative to a target heating value Qt set in step S20, on the basis of the operating point map OPM (to be described below), and determines to make the fuel cell stack 20 generate power at the target operating point TP.

Figure 7:
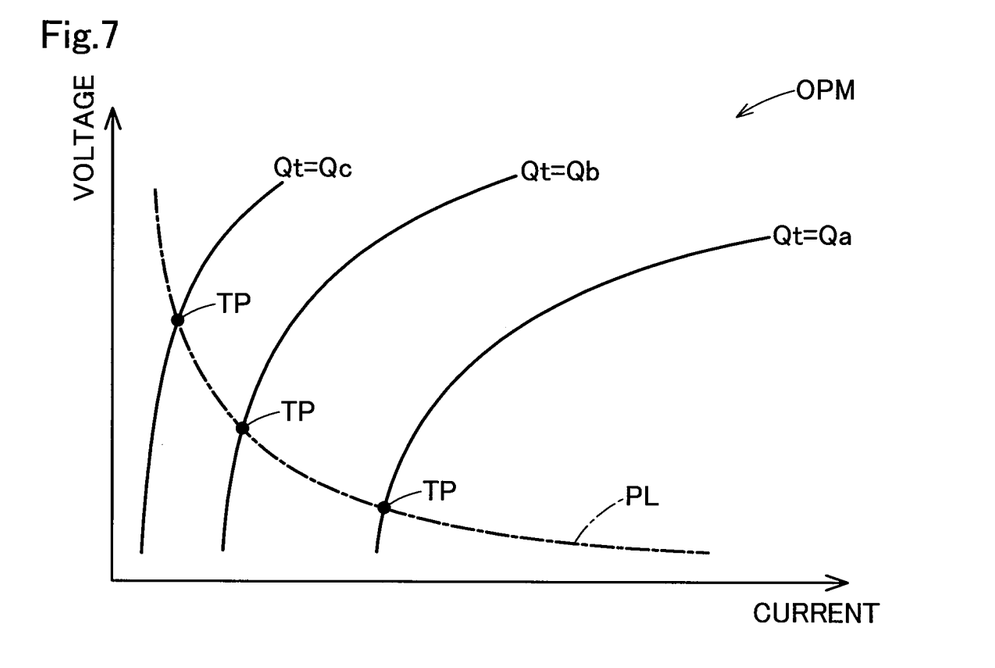
FIG. 7 shows an explanatory diagram representing one example of an operating point map.

FIG. 7 shows an explanatory diagram representing one example of the operating point map OPM. The operating point map OPM represents the relationship in which a target current value and a target voltage value of the fuel cell stack 20 are determined relative to a target heating value Qt. The present relationship is able to be acquired experimentally by measuring the current and voltage of the fuel cell stack 20 when the fuel cell stack 20 generates power at various heating values. The relationship shown in FIG. 7 and defined in the operating point map OPM is represented as a graph showing a one-to-one correlation between a target current value and a target voltage value of the fuel cell stack 20 when the fuel cell stack 20 is made to generate power at the target heating values Qa, Qb, Qc (Qa>Qb>Qc). In the operating point map OPM, the larger the target heating value Qt, the more the range of the target current value determined relative to the target heating value Qt shifts to a positive direction of the current axis thereof.

The single-dot chain line shown in FIG. 7 represents an equal power line PL indicating a constant power which the operation control unit 64 makes the fuel cell stack 20 generate at the time of the warm-up operation. The target operating points TP of the fuel cell stack 20 correspond to the points of intersection of the graph between the target heating values Qt and the equal power line PL. It is noted that since the I-V characteristics of the fuel cell stack 20 vary depending on the temperature, the equal power line PL varies depending on the temperature of the fuel cell stack 20. Therefore, the target operating point TP for the target heating value Qt varies depending on the temperature of the fuel cell stack 20. In order to determine the target operating point TP, the operation control unit 64 acquires the equal power line PL corresponding to the present temperature of the fuel cell stack 20, and acquires the target operating point TP present on the equal power line PL.

In step S40, the operation control unit 64 operates the fuel cell stack 20 at the target operating point TP which is determined in step S30 and corresponds to the target heating value Qt. More specifically, the operation control unit 64 sets the target current value as the current command value for the current control circuit 95, so that the current of the fuel cell stack 20 becomes the target current value at the target operating point TP determined in step S30. This allows adjustment of the current of the fuel cell stack 20 to the target current value, and further allows adjustment of the voltage of the fuel cell stack 20 to the target voltage value.

In step S50, the operation control unit 64 determines whether or not the monitoring unit 66 has detected abnormal fuel gas generation of the fuel gas in the cathode. In cases where abnormal generation of the fuel gas is detected in the cathode, the operation control unit 64 starts to execute operating point change processing in step S60 to change the target operating point by reducing the target heating value Qt. The operating point change processing will be described later.

In cases where abnormal generation of the fuel gas is not detected in the cathode in step S50, or after the operating point change processing is executed in step S60, the operation control unit 64 determines whether to complete the warm-up operation in step S70. The operation control unit 64 determines whether or not predetermined warm-up completion conditions are satisfied. In the present embodiment, the warm-up completion conditions are satisfied when the temperature of the fuel cell stack 20 is equal to or higher than a predetermined threshold temperature. In another embodiment, the warm-up completion conditions may be satisfied, for example, when the temperature of system auxiliary machines other than the fuel cell stack 20 is equal to or higher than a threshold temperature. Alternatively, the warm-up completion conditions may be satisfied when the warm-up completion time determined depending on the target heating value elapses.

In cases where the warm-up completion conditions are satisfied, the operation control unit 64 completes the warm-up operation, and finishes start processing. After the start processing is finished, the operation control unit 64 starts the normal operation of the fuel cell stack 20. On the other hand, in cases where the warm-up completion conditions are not satisfied, the processing returns back to step S40 and the operation control unit 64 makes the fuel cell stack 20 continuously generate power at the target operating point TP relative to the present target heating value Qt. The operation control unit 64 repeats the determination of step S50 as to whether or not fuel gas has been abnormally generated in the cathode, at a predetermined control cycle, until the warm-up completion conditions are satisfied in step S70. It is noted that while the warm-up operation is executed continuously, the target current value and the target voltage value at the target operating point TP relative to the target heating value Qt are changed depending on the present temperature of the fuel cell stack 20, so as to correspond to the variation of the I-V characteristics caused by the rise in temperature of the fuel cell stack 20.

Figure 8:
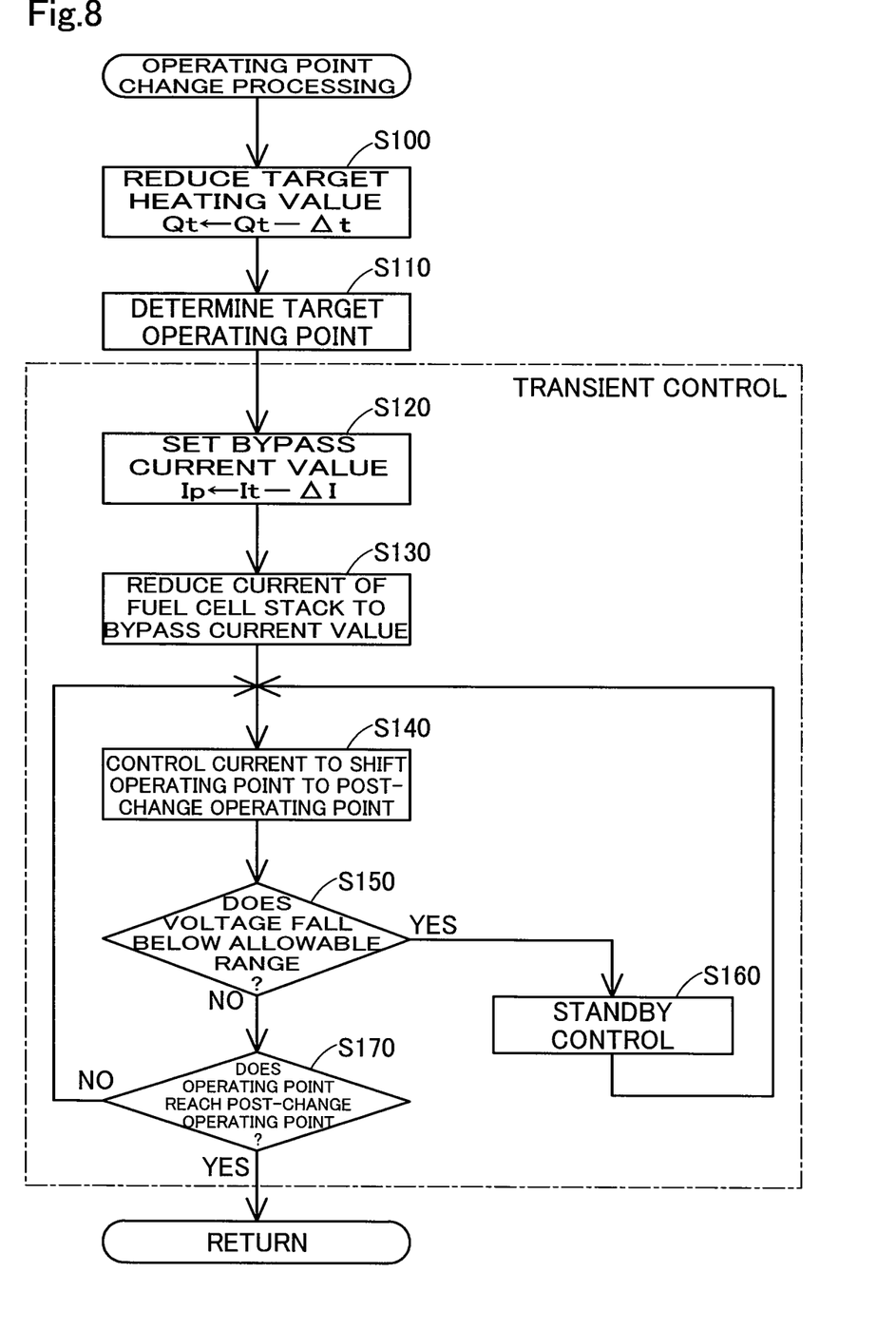
FIG. 8 shows an explanatory diagram representing a flowchart showing operating point change processing.

FIG. 8 shows an explanatory diagram representing a flowchart of the operating point change processing. The operating point change processing is executed to change the target operating point TP of the fuel cell stack 20, thereby reducing the generation of fuel gas in the cathode and suppressing the decline in heating efficiency of the fuel cell stack 20. In step S100, the operation control unit 64 changes the value of the target heating value Qt to a value lower than the target heating value Qt set at the present. In an example, the operation control unit 64 sets, as a new target heating value Qt, the value obtained by subtracting a predetermined reduction value ΔQ from the present target heating value Qt.

In step S110, as in step S30 of FIG. 6, the operation control unit 64 determines a new target operating point TP in relation to the target heating value Qt after the reduction, on the basis of the operating point map OPM shown in FIG. 7. In the succeeding steps from step S120 to step S170, transient control is executed so that the fuel cell stack 20 is able to smoothly shift to the power generation state at the target operating point TP determined in step S110.

Figure 9:
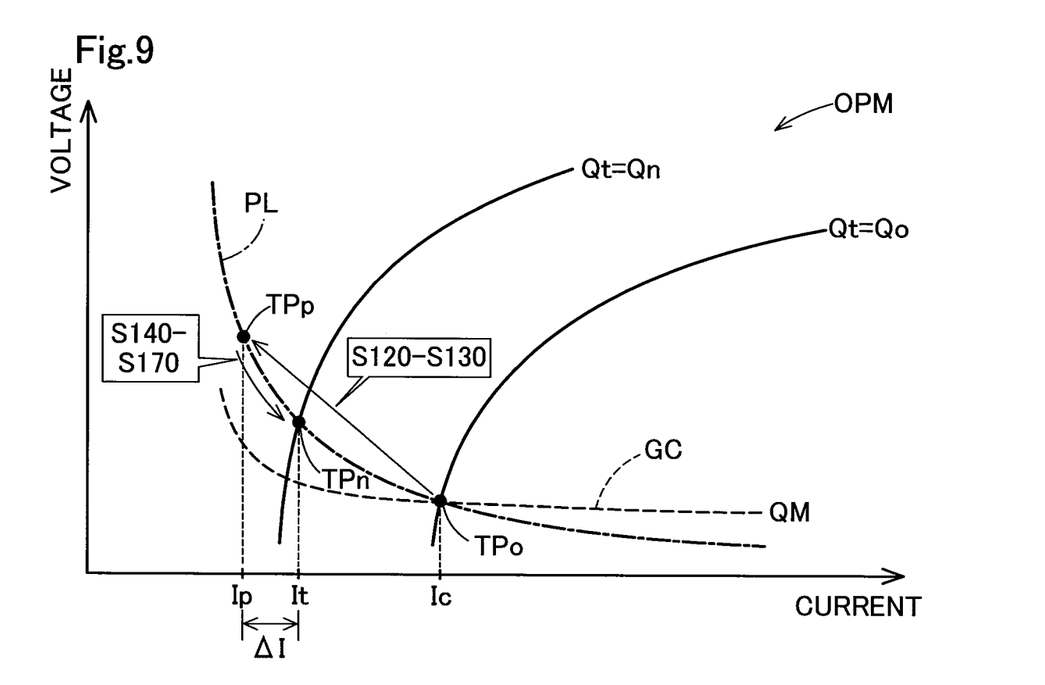
FIG. 9 shows an explanatory diagram representing transition of an operating point of a fuel cell stack in transient control.

The transient control in the steps from step S120 to step 170 is described with reference to FIG. 9. FIG. 9 schematically shows one example where the operating point of the fuel cell stack 20 is transferred on the graph representing the operating point map OPM described in FIG. 7 during the execution of transient control in the steps from step S120 to step S170. In the example shown in FIG. 9, the target heating value Qt when the abnormal generation of fuel gas is detected in the cathode is represented as a value Qo, and the target operating point TP set relative to the value Qo is represented as a point TPo. The target heating value Qt after the reduction in step S100 is represented as a value Qn, and the target operating point TP set relative to the value Qn is represented as a point TPn. Hereinafter, the value Qo is referred to as a "pre-change heating value Qo"; the point TPo is referred to as a "pre-change operating point TPo"; the value Qn is referred to as a "post-change heating value Qn"; and the point TPn is referred to as a "post-change operating point TPn".

In step S120, the operation control unit 64 sets a bypass current value Ip. The bypass current value Ip is smaller than a post-change current value It which is the target current value at the post-change operating point TPn. The operation control unit 64 sets, as the bypass current value Ip, the value obtained by subtracting a predetermined reduction amount ΔI from the post-change target current value It.

In step S130, the operation control unit 64 sets the bypass current value Ip as the current command value relative to the current control circuit 95, and makes the current control circuit 95 reduce the current of the fuel cell stack 20 from a target current value Ic at the pre-change operating point TPo to the bypass current value Ip. This shifts the operating point of the fuel cell stack 20 on the equal power line PL, to a bypass operating point TPp at which the target current value is the bypass current value Ip. Such quick and significant reduction of the current of the fuel cell stack 20 to the bypass current value Ip allows quick reduction of the conduction amount of the fuel gas ions (protons in the present embodiment) to the cathode. This allows quick suppression of the generation of the fuel gas in the cathode, and facilitation of the discharge of the fuel gas from the cathode.

In step S140, the operation control unit 64 executes the control to shift the operating point of the fuel cell stack 20 from the bypass operating point TPp to the post-change operating point TPn. The operation control unit 64 executes current control to gradually increase the current of the fuel cell stack 20 from the bypass current value Ip to the post-change target current value It, while keeping a constant power output of the fuel cell stack 20. In the present current control, the operation control unit 64 increases the current command value relative to the current control circuit 95 up to the post-change target current value It at a predetermined speed less than the response speed of the fuel cell stack 20.

The operation control unit 64 periodically executes the determination processing of step S150 while increasing the current of the fuel cell stack 20 from the bypass current value Ip to the post-change target current value It. In step S150, the operation control unit 64 determines whether or not the voltage of the fuel cell stack 20 falls below its allowable range. The allowable range herein is the range in which the fuel cell stack 20 is suppressed from unstably generating power, and which is determined in advance through experiments. In cases where the measurement value measured by the voltage sensor 91 is equal to or lower than a predetermined first threshold value Va, the operation control unit 64 deems that the voltage of the fuel cell stack 20 falls below its allowable range, and executes the standby control of step S160 (to be described later). In cases where the measurement value measured by the voltage sensor 91 is greater than the first threshold value Va, the operation control unit 64 continues the control as is to increase the current of the fuel cell stack 20.

In step S170, in cases where the current command value of the fuel cell stack 20 is set to the post-change target current value It, and where the operating point of the fuel cell stack 20 reaches the post-change operating point TPn, the operation control unit 64 finishes the operating point change processing, and the processing returns to the start processing shown in FIG. 6. The operation control unit 64 thereafter continues the warm-up operation with the post-change operating point TPn as the target operating point TP until the warm-up completion conditions are satisfied in step S70 of FIG. 6.

In this case, after the target heating value Qt of the fuel cell stack 20 is reduced in the operating point change processing, the target heating value Qt is not set to a high level until the warm-up operation is completed. Therefore, the fuel cell stack 20 is suppressed from being brought into a state of unstable power generation, which may be caused by frequent changes in the power generation conditions of the fuel cell stack 20 due to vertical fluctuations of the target heating value Qt. Therefore, application of a load to the secondary battery 96 having narrow allowable range of charging/discharging amounts under low temperature environments due to the variation in the power generation amount of the fuel cell stack 20 is suppressed. After the target heating value Qt of the fuel cell stack 20 is reduced in the operating point change processing, and the target heating value Qt is once again set back to a high level, the abnormal generation of fuel gas is more likely to occur in the cathode. Therefore, after the target heating value Qt of the fuel cell stack 20 is reduced in the operating point change processing, the target heating value Qt shall not be set to a high level. This allows for the suppression of repeated abnormal generation of fuel gas in the cathode.

Figure 10:
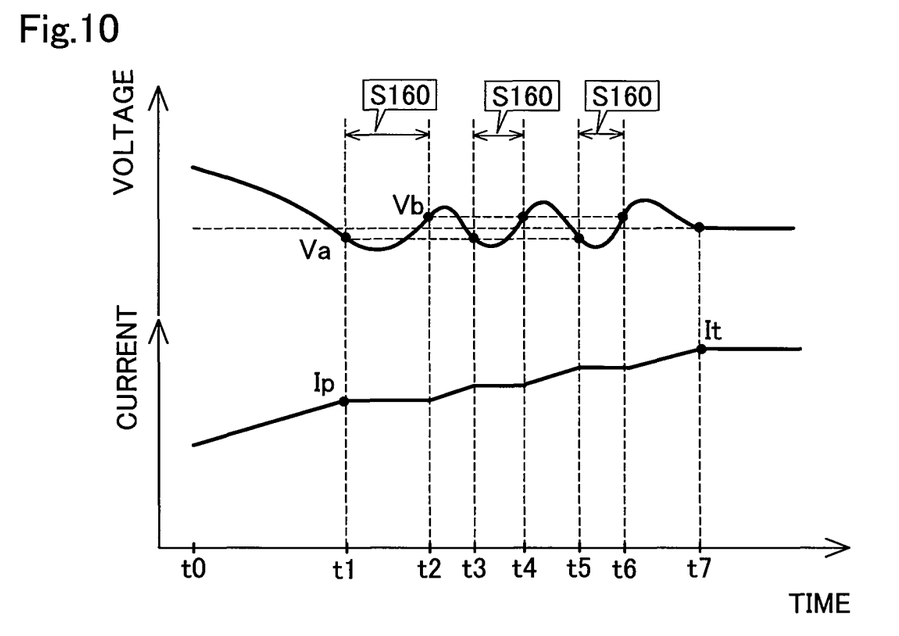
FIG. 10 shows an explanatory diagram representing one example of the variation over time of the voltage and current of the fuel cell stack due to standby control.

The standby control of step S160 is described with reference to FIG. 10. FIG. 10 shows an explanatory diagram representing one example of the variation over time of the voltage and current of the fuel cell stack 20 while standby control is executed repeatedly.

As described above, in cases where the measurement value measured by the voltage sensor 91 becomes equal to or lower than the first threshold value Va while the current of the fuel cell stack 20 is increased to the post-change target current value It, the standby control of step S160 is executed (time t1). The reason the measurement value measured by the voltage sensor 91 becomes equal to or lower than the first threshold value Va is because the oxidizing gas in the cathode is insufficient. The operation control unit 64 executes standby control to keep the standby state where the current command value of the current control circuit 95 is kept constant, and waits for the oxidizing gas to reach the cathode and for the voltage of the fuel cell stack 20 to rise.

In cases where the voltage of the fuel cell stack 20 increases and reaches a second threshold value Vb or higher, the operation control unit 64 finishes the standby control, and re-executes control to increase the current of the fuel cell stack 20 (time t2). In the present embodiment, the second threshold value Vb is set to a value greater than the first threshold value Va. In another embodiment, the second threshold value Vb may be equal to the first threshold value Va. Alternatively, in cases where after the start of the standby control, the voltage of the fuel cell stack 20 is changed to increase, and the detected voltage is larger than the second threshold value Vb which is lower than the first threshold value Va, the standby control may be finished.

Standby control is repeatedly executed until the current of the fuel cell stack 20 reaches the post-change target current value It, in order to prevent the voltage of the fuel cell stack 20 from being reduced significantly. In the example of FIG. 10, after the first standby control executed in the period from time t1 to time t2, standby control is repeatedly executed in the period from a time t3 to a time t4 and the period from a time t5 to a time t6, and thereafter the current of the fuel cell stack 20 reaches the post-change target current value It at a time t7.

As described above, the standby control executed in the transient control of the operating point change processing allows for suppression of the voltage of the fuel cell stack 20 from being excessively reduced, and allows for suppression of the fuel cell stack 20 from unstably generating power. Accordingly, the standby control allows for a smoother shift of the operating point of the fuel cell stack 20 to the post-change operating point TPn than in cases where standby control is not executed.

The following description with reference to FIG. 9 is about the reason for reducing the target heating value of the fuel cell stack 20 in the operating point change processing. In FIG. 9, a graph GC is represented by a broken line, which connects actual measurement values of the current and voltage of the fuel cell stack 20 at a time when fuel gas is abnormally generated in the cathode and the fuel cell stack 20 thus generates heat at an actual heating value QM. The actual heating value QM is lower than the pre-change heating value Qo and the post-change heating value Qn shown in FIG. 9.

When fuel gas is abnormally generated in the cathode, the fuel cell stack 20 is in a deteriorated power generation state. Thus, the graph GC largely deviates from the current-voltage curve for determining the target heating value Qt defined in the operating point map OPM. Further, when fuel gas is abnormally generated in the cathode, the heating value of the fuel cell stack 20 is less than when in a normal state. Therefore, in cases where fuel gas is abnormally generated in the cathode, even if the fuel cell stack 20 is made to generate power at the target operating point TP set relative to the target heating value Qt, the heating value of the fuel cell stack 20 decreases to less than the target heating value Qt. In the example of FIG. 9, the fuel cell stack 20 at the time of generating power at the pre-change operating point TPo generates heat at the actual heating value QM, which is less than the pre-change heating value Qo.

At this time, in cases where abnormal generation of fuel gas is detected in the cathode, and where operating point change processing is executed, the target generating value Qt is reduced. This reduces the current of the fuel cell stack 20 and reduces the fuel gas ions moving to the cathode. This further suppresses the generation of fuel gas in the cathode, and facilitates the reduction of the fuel gas which is present in the cathode. Therefore, the fuel gas present in the cathode reduces the power generation of the fuel cell stack 20 and the heating value of the fuel cell stack 20 is suppressed from declining to a value significantly lower than the target heating value Qt. As a result, the actual heating value of the fuel cell stack 20 is able to be increased to more than when the warm-up operation is continued with the target heating value Qt kept at the pre-change heating value Qo, thereby enabling suppression of the decline in heating efficiency of the fuel cell stack 20 in the warm-up operation.

As described above, in the fuel cell system 10 of the present embodiment, in cases where abnormal generation of fuel gas is detected in the cathode during the execution of the warm-up operation, the target heating value Qt is reduced, and thereby the operating point is changed so that the current of the fuel cell stack 20 is reduced. This facilitates the reduction of the fuel gas present in the cathode, and suppresses the decline in heating efficiency of the fuel cell stack in the warm-up operation.

2. Other Embodiments

The various configurations described in the above embodiment may be modified as in the following examples. The other embodiments to be described below are all deemed merely as examples for embodying the technique in the present disclosure, as in the above-described embodiment.

Other Embodiment 1

In cases where the operation control unit 64 detects the abnormal generation of fuel gas in the cathode and reduces the target heating value Qt, and thereafter detects that the abnormal generation of fuel gas in the cathode has been resolved, the operation control unit 64 may increase the target heating value Qt and return it back to the original value before the change even before the warm-up operation is completed.

Other Embodiment 2

The operation control unit 64 may control, without the operating point map OPM, the current of the fuel cell stack 20 according to the target heating value Qt in the warm-up operation. In an example, the operation control unit 64 may control the current of the fuel cell stack 20 as per the target current value uniquely defined relative to the target heating value Qt. The operation control unit 64 may reduce the current of the fuel cell stack 20 without executing the transient control or the standby control described in FIG. 8.

Other Embodiment 3

The operation control unit 64 may elect not to reduce the stoichiometric ratio in the warm-up operation to a value lower than in the normal operation of the fuel cell stack 20. The operation control unit 64 may control the stoichiometric ratio of the oxidizing gas in the warm-up operation to a ratio equal to or larger than the stoichiometric ratio in the normal operation of the fuel cell stack 20.

3. Other

In the above-described embodiments, some or all of the functions and processing realized by software may be realized by hardware. Further, some or all of the functions and processing realized by hardware may be realized by software. The hardware may be configured with various types of circuits, for example, an integrated circuit, a discrete circuit, or a circuit module with these circuits combined.

The present disclosure is not limited to the above-described embodiments, and is realizable in various types of configurations without deviating from its purpose. In an example, the technical features of the embodiments may be replaced or combined as appropriate in order to solve some or all of the above-described problems, or in order to achieve some or all of the above-described effects. Further, the technical features may be deleted as appropriate, unless they are described as essential in the present specifications. In an example, the present disclosure may be realized in the following aspects.

(1) The present disclosure in one aspect provides a fuel cell system. The fuel cell system includes a fuel cell stack comprising an anode and a cathode; an oxidizing gas supply system configured to supply oxidizing gas to the cathode; a fuel gas supply system configured to supply fuel gas to the anode; a current control circuit configured to control an output current of the fuel cell stack; a control unit configured to control power generation of the fuel cell stack, and the output current of the current control circuit, the control unit controlling the current control circuit to adjust the output current thereby adjusting a heating value of the fuel cell stack; and a monitoring unit configured to monitor abnormal fuel gas generation, the abnormal fuel gas generation corresponding to a state where the fuel gas in excess of a predetermined allowable amount exists in the cathode. When the monitoring unit detects the abnormal fuel gas generation during execution of a warm-up operation to allow the fuel cell stack to generate heat with a predetermined target heating value, the control unit reduces the output current by reducing the target heating value.

According to the fuel cell system in the present aspect, when abnormal fuel gas generation is detected in the cathode during the execution of the warm-up operation, the target heating value is reduced, and thereby the current of the fuel cell stack is reduced. This suppresses ion conduction of the fuel gas to the cathode, enabling the reduction of the fuel gas present in the cathode. Therefore, due to the fuel gas present in the cathode, the power generation amount of the fuel cell stack is reduced, and thus the actual heating value of the fuel cell stack is prevented from being significantly reduced to a value lower than the target heating value, and the fuel cell system is capable of suppressing the reduction of the temperature increase rate of the fuel cell stack during warm-up operations.

(2) In the fuel cell system in the above-described aspect, when reducing the output current by reducing the target heating value during execution of the warm-up operation, the control unit may not set the target heating value to be higher than the reduced target heating value until completion of the warm-up operation.

The fuel cell system in the present aspect is capable of suppressing the unstable power generation of the fuel stack, which may be caused by frequent changes in the power generation conditions of the fuel cell stack due to vertical fluctuations of the target heating value during execution of the warm-up operation.

(3) In the fuel cell system in the above-described aspect, during execution of the warm-up operation, the control unit may use a relationship between the output current necessary to allow the fuel cell stack to generate heat with the target heating value, and an output voltage of the fuel cell stack, thereby adjusting the output current so that an output power of the fuel cell stack is a predetermined constant power. When the monitoring unit detects the abnormal fuel gas generation during execution of the warm-up operation, the control unit may reduce the output current to a post-change target current value determined using the relationship from the constant power and a post-change heating value to reduce the target heating value.

The fuel cell system in the present aspect is capable of controlling the state of the power generation of the fuel cell stack as appropriate on the basis of the target heating value, and is further capable of stabilizing the power obtained from the fuel cell stack during the warm-up operation.

(4) The fuel cell system in the above-described aspect may further include a voltage sensor configured to measure the output voltage. During execution of the warm-up operation, the control unit may execute transient control, the transient control reducing the output current to a bypass current value lower than the post-change target current value, and then increasing the output current to the post-change target current value. In the transient control, when a measurement value measured by the voltage sensor is lower than a predetermined threshold value, while the output current is increased from the bypass current value to the post-change target current value, the control unit may execute standby control to keep a current command value input to the current control circuit constant.

In the fuel cell system in the present aspect, the current of the fuel cell stack is temporarily reduced significantly to the bypass current value, thereby enabling quicker suppression of the generation of the fuel gas in the cathode. The standby control suppresses the voltage of the fuel cell stack from being significantly reduced when the current of the fuel cell stack is increased from the bypass current value to the post-change target current value. This allows for a smoother change in the current of the fuel cell stack.

(5) In the fuel cell system in the above-described aspect, the control unit may reduce a stoichiometric ratio of the oxidizing gas in the warm-up operation to be lower than that when the fuel cell stack is in normal operation.

In the fuel cell system in the present aspect, the heating value of the fuel cell stack is able to be increased more, thereby enabling efficient warm-up of the fuel cell stack.

The present disclosure is realizable in various aspects: not only a fuel cell system, but also, for example, a control method of a fuel cell system, a computer program for making a computer execute the control method, and a non-transitory storing medium storing a computer program.

What is claimed is:

1. A fuel cell system comprising:
   a fuel cell stack comprising an anode and a cathode;
   an oxidizing gas supply system configured to supply oxidizing gas to the cathode;
   a fuel gas supply system configured to supply fuel gas to the anode;
   a current control circuit configured to control an output current of the fuel cell stack;
   a control unit configured to control power generation of the fuel cell stack, and the output current of the current control circuit, the control unit controlling the current control circuit to adjust the output current thereby adjusting a heating value of the fuel cell stack; and
   a monitoring unit configured to monitor abnormal fuel gas generation, the abnormal fuel gas generation corresponding to a state where the fuel gas in excess of a predetermined allowable amount exists in the cathode, wherein
   when the monitoring unit detects the abnormal fuel gas generation during execution of a warm-up operation to allow the fuel cell stack to generate heat with a predetermined target heating value, the control unit reduces the output current by reducing the target heating value.

2. The fuel cell system according to claim 1, wherein when reducing the output current by reducing the target heating value during execution of the warm-up operation, the control unit does not set the target heating value to be higher than the reduced target heating value until completion of the warm-up operation.

3. The fuel cell system according to claim 1, wherein during execution of the warm-up operation, the control unit uses a relationship between the output current necessary to allow the fuel cell stack to generate heat with the target heating value, and an output voltage of the fuel cell stack, thereby adjusting the output current so that an output power of the fuel cell stack is a predetermined constant power, and
when the monitoring unit detects the abnormal fuel gas generation during execution of the warm-up operation, the control unit reduces the output current to a post-change target current value determined using the relationship from the constant power and a post-change heating value to reduce the target heating value.

4. The fuel cell system according to claim 3, the fuel cell system further comprising:
   a voltage sensor configured to measure the output voltage, wherein
   during execution of the warm-up operation, the control unit further executes transient control, the transient control reducing the output current to a bypass current value lower than the post-change target current value, and then increasing the output current to the post-change target current value, and
   in the transient control, when a measurement value measured by the voltage sensor is lower than a predetermined threshold value, while the output current is increased from the bypass current value to the post-change target current value, the control unit executes standby control to keep a current command value input to the current control circuit constant.

5. The fuel cell system according to claim 1, wherein the control unit reduces a stoichiometric ratio of the oxidizing gas in the warm-up operation to be lower than that when the fuel cell stack is in normal operation.

6. A control method of a fuel cell system including a fuel cell stack, the control method comprising the steps of:
   making the fuel cell stack start power generation, by supplying oxidizing gas to a cathode of the fuel cell stack and supplying fuel gas to an anode of the fuel cell stack;
   starting a warm-up operation to allow the fuel cell stack to generate heat with a predetermined target heating value of the fuel cell stack; and
   during execution of a warm-up operation, when the fuel gas in excess of a predetermined allowable amount exists in the cathode, reducing the target heating value so as to reduce the output current.

* * * * *